May 21, 1935.  A. GAUTHIER ET AL  2,001,840
LENS SHUTTER WITH COMBINED EXPOSURE METER, VIEW FINDER, AND DISTANCE METER
Filed Aug. 15, 1931  2 Sheets-Sheet 1
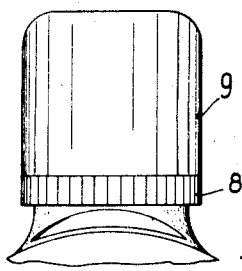
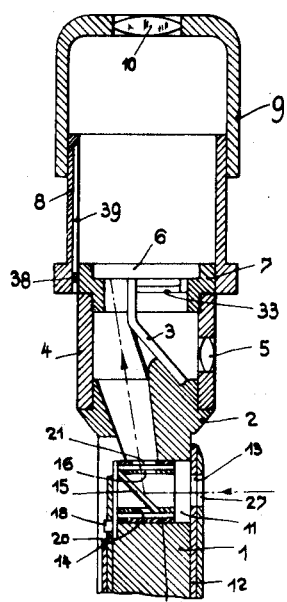
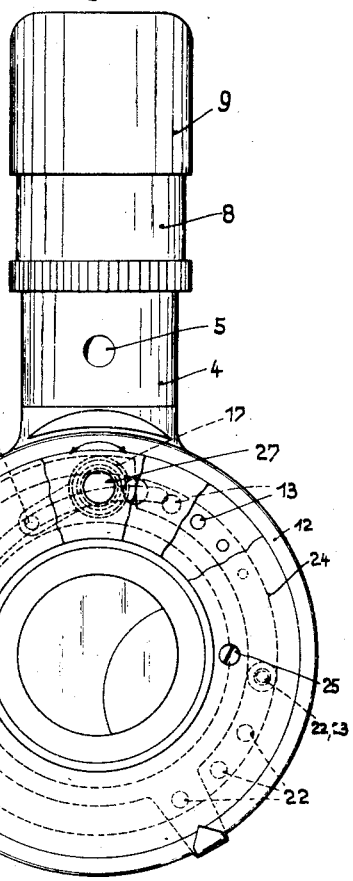
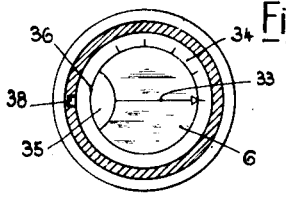
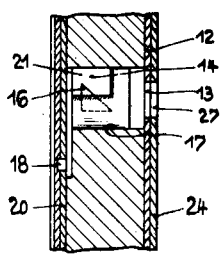

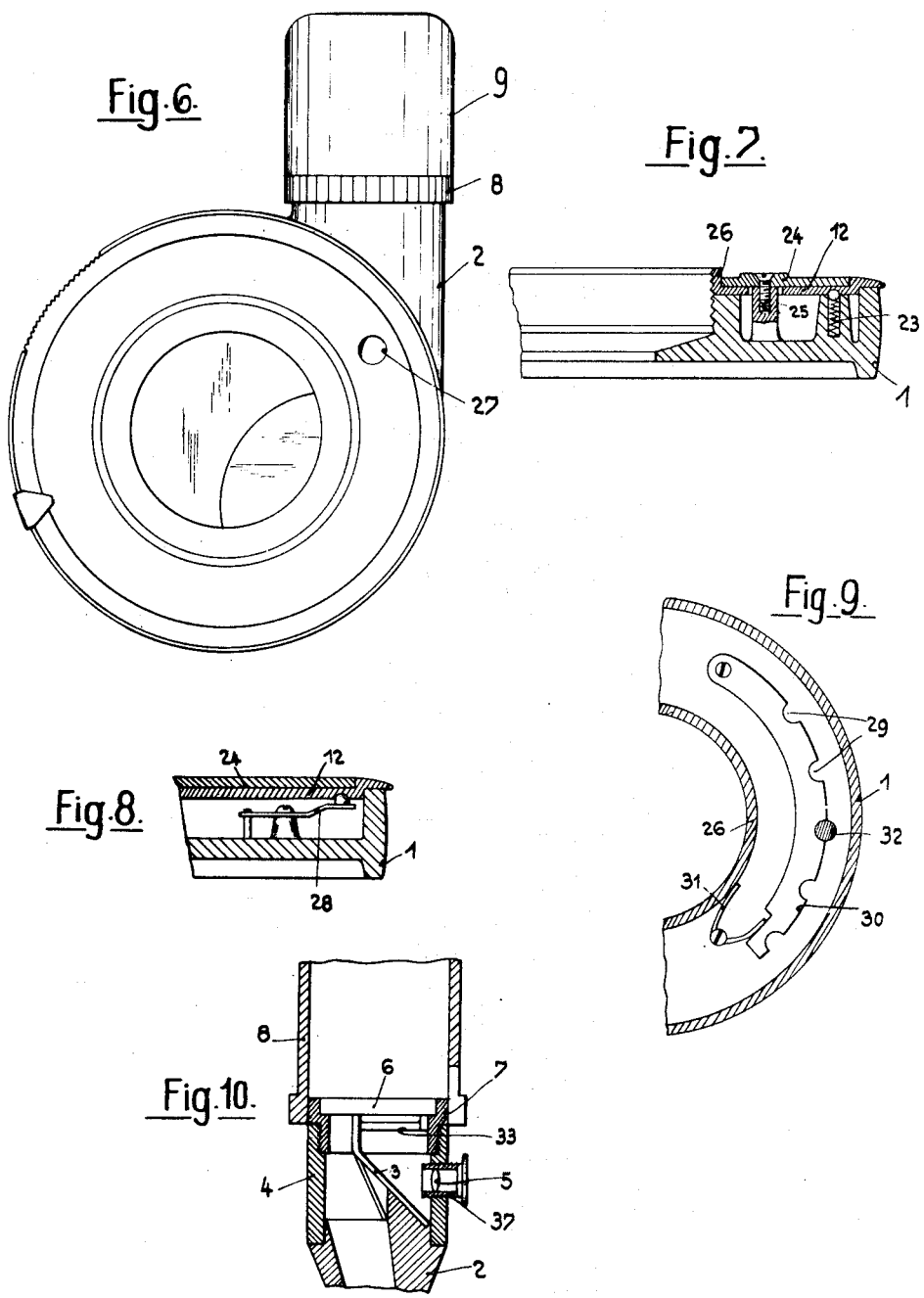

Patented May 21, 1935

2,001,840

UNITED STATES PATENT OFFICE 2,001,840

LENS SHUTTER WITH COMBINED EXPOSURE METER, VIEW FINDER AND DISTANCE METER

Alfred Gauthier, Calmbach-Enz, and Karl Bührle, Hofen-Enz, Germany

Application August 15, 1931, Serial No. 557,292
In Germany April 2, 1931

1 Claim. (Cl. 88—23)

This invention relates to a lens shutter, a combined exposure meter, view finder and distance meter in such a manner that the adjusting elements of the exposure meter are positively connected with the devices of the shutter regulating the exposure and the adjustment of the diaphragm.

In the known constructions the positive connection of the shutter adjusting elements with the regulating elements of the exposure shutter is effected by intermediate members, which however results in a considerable enlargement of the shutter so that it is not suitable for use in modern cameras. A further objection of the known constructions consists in that irrespective of whether a single ground glass section is provided for all observations or a separate section for measuring the exposure is provided on the common ground glass screen, always one and the same passage serves at the same time for admitting light, so that there is a continual mutual influencing of these independent arrangements. This mutual influencing can only be avoided by separately conducting light to the two arrangements, for which purpose, however, separate light admission apertures and separate light excluding devices are necessary, it being immaterial whether separate light admission passages with separate sections on a common ground glass screen or a common light admission passage and a light excluding device for the view finder or distance meter are provided for rendering the exposure measuring independently. This measure when employing the known means would, however, result in a further undesirable enlargement of the dimensions of the camera.

According to the invention only the light regulating and diaphragm elements of the exposure meter, which has only one ground glass screen in common with the view finder and distance meter and is rendered independent of the view finder or distance meter by individual air admission passages passing to a separate section of the ground glass screen or by screening devices for the view finder or distance meter, are accommodated within the shutter casing arranged concentrically around the lens, and the time adjustment disc of the shutter is constructed as throttle element for the quantity of light entering the exposure meter. In this manner the construction of the camera shutter is not made larger than if only the view finder or distance meter alone were arranged on the shutter, which however, is general and is always taken into consideration in the dimensioning of the camera.

Several embodiments of the invention are illustrated by way of example in the accompanying drawings, in which:

Fig. 1 shows in front elevation a lens shutter with exposure meter, view finder and focussing meter mounted thereon and with adjustable ground glass screen and vertical optical axis.

Fig. 2 is a cross section of Fig. 1.

Fig. 3 shows the instrument in inoperative position.

Fig. 4 is a top plan view of the screen.

Fig. 5 shows in top plan view the regulating device for the exposure meter.

Fig. 6 shows a further possibility of arrangement of the instrument on the shutter.

Figs. 7 and 8 are sectional views through the setting arrangement of the time adjusting disc for two different forms of construction.

Fig. 9 shows in part front view a third form of construction of the setting arrangement with the time adjusting disc removed.

Fig. 10 shows a form of construction of the instrument according to Figs. 1 and 2, with adjustable view finding lens.

Figs. 1 to 9 show how an instrument combining an exposure meter, view finder and focussing meter with vertical optical axis is fitted on the shutter and cooperates therewith. The lower part 2 of the instrument is mounted on the shutter casing 1 and accommodates the view finder mirror 3, and a ring 4 with the view finding lens 5. Into the upper end of the ring 4 a screw threaded ring 7 carrying the ground glass screen 6 is screwed. A tube 8 is shiftably mounted on the rings 4 and 7, and on this tube a cap 9 is shiftably mounted with the view finder lens 10, to enable this latter to be adjusted at a proper distance relative to the ground glass screen. The tube 8 is also rotatably connected to the ring 7 carrying the ground glass screen 6, this connection being effected for example by a pin 38 projecting from the ring 7 and engaging in a groove 39 in the tube 8. The transmission of movement may, however, be effected by friction between the tube 8 and the ring 7. An admission aperture 11 is provided in the shutter casing for the light intended for the exposure measuring and can be brought into register with the holes 13, provided in the time adjustment disc 12 graded according to the different exposure times and corresponding thereto. Opposite the aperture 11 and holes 13 a mirror 15, arranged in a stationary cylinder 14, is situated and deflects the light, falling on to the ground glass screen 6 from the outside through a triangular gap 16 provided in the cylinder 14. Around this stationary cylinder 14 a cylinder 17 is rotatably mounted which, through the intermediary of a pin 18 guided in a slot 19 of the diaphragm plate disc 20, is turned relative to the stationary cylinder 14 during the turning of the diaphragm disc 20, and its triangular gap 16 is thus more or less exposed by shifting the aperture 21 of the cylinder 17 (Fig. 5). In order that the holes 13 in the time adjusting disc when this is being rotated register exactly with the light admission aperture 11 without it being necessary to use the eye for this purpose, a setting mechanism coacting with the time adjusting disc is provided which can be constructed in various manners. According to Fig. 7 notches 22 are provided in the time adjusting disc 12 which correspond to the several time adjustments. A ball, pressed against the disc 12 by a spring 23 mounted in the casing 1, oscillatably engages with one of these notches. A cover plate 24, fixed in known manner to the casing 1 by screws 25, affords the necessary support for the time disc 12 rotatably mounted on the lens support 26 and has a light admission aperture 27.

Fig. 8 shows a modified form of construction of the setting mechanism, wherein the ball is replaced by a knob fixed on a blade spring 28. A further form of construction of the setting mechanism is illustrated in Fig. 9 and consists of a lever 30 oscillatably mounted in an annular space of the shutter casing 1, provided with notches 29 and pressed by means of a spring 31 continually against a pin 32 of a time adjusting disc, resiliently engaging in the notches 29 corresponding to the different time adjustments. This notch lever 30 may, providing the notches are arranged in a suitable curve, serve at the same time as a blocking lever for a preliminary clockwork mechanism in the shutter in the event of certain time adjustments. The holes 13 in the time adjusting disc may also be replaced by a conical slot, in which case the setting mechanism is omitted. The adjustment of the quantity of light passing into the exposure meter may also be effected by a conical slot in the diaphragm disc.

The operation is as follows:—

If it is desired to take a photograph, the tube 8 and the cap 9, which in inoperative position are pushed in, as shown in Fig. 3, are pulled out until the grain of the focussing screen 6 appears sharp to the eye of the observer. The camera is then adjusted to the object to be photographed with the aid of the view finder. The distance of the object from the camera is measured by sharply adjusting its image reflected on the ground glass screen by turning the screw threaded ring 7, that is by shifting the screen with the aid of the knurled tube 8. After this has been effected, the hand 33 fixed on the mirror 3 immediately indicates on the scale 34 of the screen the focus to which the camera must be adjusted. The exposure meter is adjusted after or before the focusing. This is effected by regulating according to the time adjustment the quantity of light passing in through the apertures 27, 13, 11 and projected against the ground glass screen 35 by the mirror 15 and consequently the cylinder 17, which covers the aperture 16 more or less, so that the black line 36 on the ground glass screen just disappears. In Fig. 10 the view finding lens 5 is not rigidly mounted in the tube 4, but in a screw threaded ring 37, the turning of which results in a changing of the distance between the lens 5 and the mirror 3. The ground glass screen 6 is rigidly fixed in the ring 4 by its ring 7. The finder picture is consequently set sharp in this instance by turning the screw threaded ring 37 for the purpose of measuring the distance, a scale which shows the degree of turning of the ring 37 indicating the focus to be set. Owing to the fact that the ground glass screen is stationary and does not lift, as in the foregoing forms of construction, off the wall separating the finder and the exposure meter, during the distance measuring, the danger of the light rays of the view finder coming into the exposure meter and influencing its measuring result, is avoided.

We claim:—

A lens shutter with combined exposure meter and view finder, comprising in combination with the lens, a shutter casing concentrically surrounding said lens and provided with two light passages each having a light admission aperture at one end, a common ground glass screen covering the other ends of said passages and divided into separate sections by said passages, light regulating and deflecting elements of the exposure meter arranged in one of said passages, a light deflecting element for the view finder in the other of said passages, a view finder lens in the aperture at the end of said view finder passage, and a time adjusting disc in said casing constructed as a throttle element for the quantity of light entering the aperture of said exposure meter passage.

ALFRED GAUTHIER.
KARL BÜHRLE.